April 8, 1941. G. E. IRVIN Re. 21,764
RADIO ANTENNA RETRACTING MECHANISM
Original Filed Aug. 4, 1934
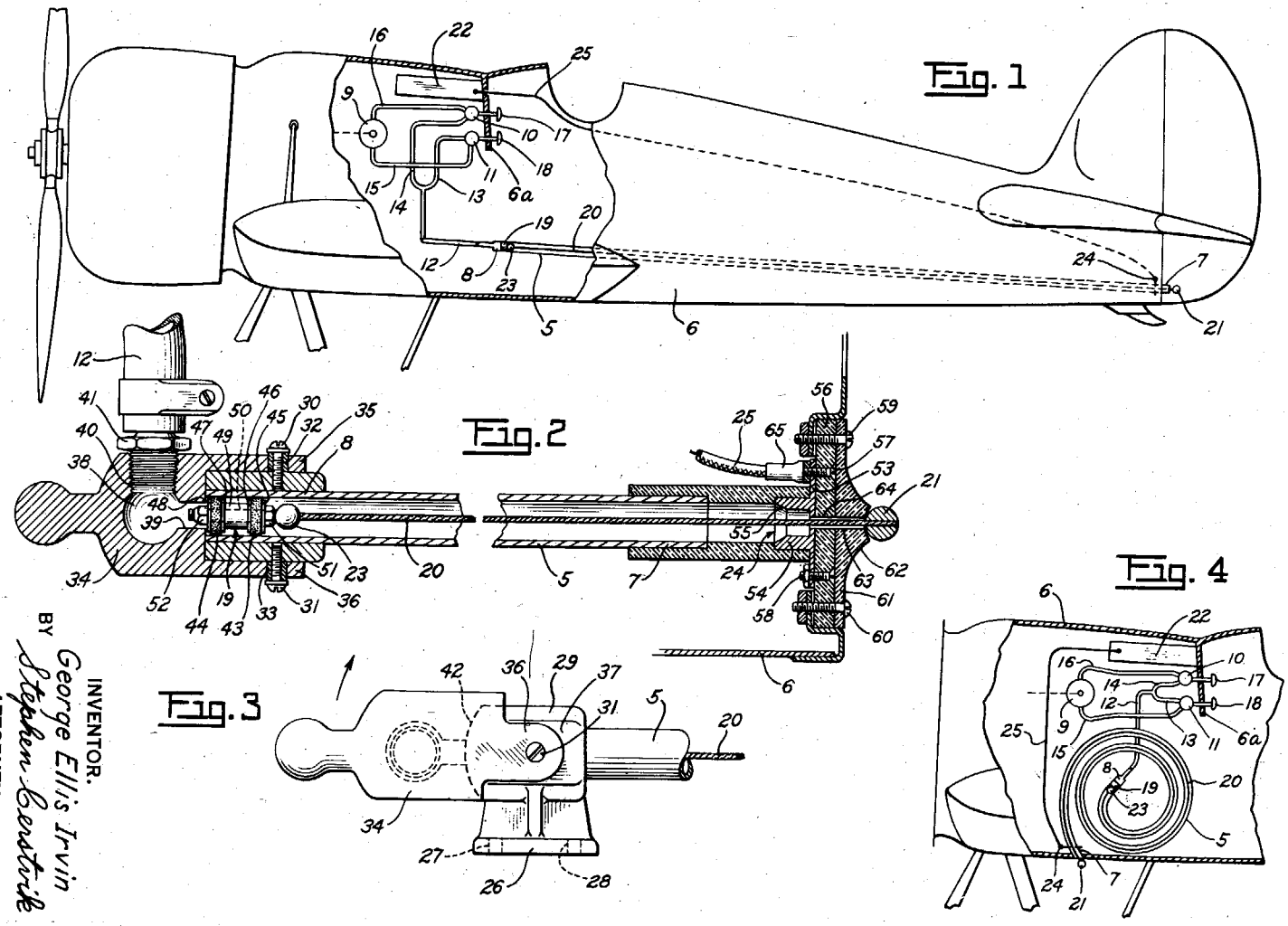
INVENTOR.
George Ellis Irvin
BY Stephen Gerstrik
ATTORNEY.

Reissued Apr. 8, 1941 Re. 21,764

UNITED STATES PATENT OFFICE 21,764

RADIO ANTENNA RETRACTING MECHANISM

George Ellis Irvin, Los Angeles, Calif., assignor, by mesne assignments, to Bendix Aviation Corporation, South Bend, Ind., a corporation of Delaware Original No. 2,080,539, dated May 18, 1937, Serial No. 738,552, August 4, 1934. Application for reissue September 28, 1938, Serial No. 232,214

20 Claims. (Cl. 250—33)

The present invention relates to radio antennae and more particularly to antennae of the retractible type adapted for use on aircraft.

Heretofore, an aircraft antenna of the retractible type was generally wound on a reel which had to be rotated manually by the pilot when letting the antenna out and hauling it in. This required a long and tedious operation by the pilot when he wanted to use his radio signalling system. Also, the antenna was always permanently connected to the radio signalling apparatus, i. e., when it was reeled in and when it was reeled out for use. Such a permanent connection was a source of danger in the event the pilot failed to reel out the antenna when operating the radio transmitter because the high frequency currents emitted from the antenna, when coiled on the reel layer upon layer, were apt to set fire to the craft.

One of the objects of the present invention, therefore, is to provide a retractible antenna having novel means for quickly and automatically ejecting it from and retracting it into the aircraft and for automatically connecting it to and disconnecting it from the radio signalling apparatus when ejected and retracted, respectively, whereby the difficulties mentioned above are eliminated.

Another object is to provide novel power retracting mechanism for a radio antenna whereby the latter may be ejected and retracted quickly, automatically and substantially instantaneously.

Still another object is to provide novel power retracting mechanism for a radio antenna whereby fluid pressure and/or suction may be employed to eject and retract the antenna substantially instantaneously, i. e., by a relatively short operation.

The above and other objects and advantages of the invention will appear more fully hereinafter from a consideration of the detailed description which follows, taken together with the accompanying drawing wherein two embodiments of the invention are illustrated. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views:

Fig. 1 is a schematic view showing one embodiment of the invention installed on an aircraft such as an airplane, for example;

Fig. 2 is a detailed longitudinal section of the radio antenna and its retracting mechanism per se;

Fig. 3 is a partial detailed view of the exterior of the intake and of the retracting mechanism; and Fig. 4 is a schematic view of another embodiment of the invention whereby a saving of space is effected.

In accordance with the present invention there is provided a relatively long tube within which the radio antenna is adapted to be housed when not in use and preferably having substantially the same length as the antenna. The tube or antenna housing is made to function as a cylinder of a fluid pressure motor and for this purpose one end thereof is connected to a source of fluid pressure such as air pressure, and means are provided whereby air may be passed into and exhausted from the tube. A piston is provided within the tube and is adapted to be moved therein in one direction when pressure is applied and in an opposite direction when suction is applied to the same end of the tube. This movement of the piston within the tube is then utilized to eject the antenna from and to haul it into the tube and, therefore, one end of the antenna wire is connected to this piston. An arrangement is also provided whereby the antenna wire is automatically connected to a radio signalling apparatus when the antenna is ejected from the tube and immediately upon the piston reaching the end of its travel in an outward direction and whereby the antenna wire is immediately disconnected when the piston starts its inward travel upon hauling in of the antenna.

Referring to the drawing, and more particularly to the schematic arrangement shown in Fig. 1, the novel antenna retracting mechanism, as set forth above, comprises a relatively long tube 5, preferably of some suitable light weight material such as aluminum, for example, mounted in the fuselage 6 of an aircraft such as an airplane. The tube 5, in the present instance, preferably extends substantially from a point near the cockpit to the tail of the airplane so that its length is practically equal to the desired length of the radio antenna to be employed. The outer or tail end 7 of the tube 5 is open to the atmosphere and the inner end 8 is connected to a suitable source of pressure such as a vacuum pump 9 through valves 10 and 11 and conduits 12, 13, 14, 15 and 16. The vacuum pump 9 is preferably operated by the engine of the aircraft which is generally provided with such a pump for furnishing a fluid pressure, a pressure above atmospheric pressure being generally designated in the art as positive pressure and a pressure below atmospheric pressure as a negative pressure, for operating gyroscopic indicating instruments such, for example, as the turn indicator, the directional gyro and the artificial horizon.

By means of valves 10 and 11 and conduits 13 and 14, the conduit 12 may be alternately connected to the pressure conduit 16 or the suction 15 of the vacuum pump 9. To effect this change from pressure to suction by means of the valves 10 and 11, the latter are provided with actuating members 17 and 18, respectively, which may be in the form of push buttons mounted on the usual instrument panel 6a, for example, and adapted to open their respective valves when pushed inwardly and to close said valves when moved outwardly, either manually or by means of springs (not shown). Within the tube 5 there is provided a piston 19 the structure of which will be described more fully hereinafter. The tube 5 and piston 19, therefore, constitute the power motor of the retracting mechanism.

From the structure thus far described, it will be seen that when the valve 10 is actuated into an open position by pushing the operating member 17 inwardly, a positive pressure is supplied to the tube 5 through its end 8 by means of the conduits 12, 14 and 16 and thereupon piston 19 is forced practically instantaneously to the other end 7 of the tube 5. On the other hand, when valve 11 is opened by means of its actuating member 18 a suction or negative pressure is introduced to the end 8 of the tube 5 through the conduits 12, 13 and 15 whereupon the piston 19 is immediately and practically instantaneously moved from the outer end 7 to the inner end 8 of the tube 5 by means of the suction. This movement of the piston is utilized to eject and retract the antenna wire shown at 20 (preferably a relatively stiff steel or phosphor-bronze cable) and for this purpose, one end of the antenna wire is connected to the piston 19 as shown, and the other end, i. e., the trailing end is provided with a weight 21 which is generally employed in aircraft radio antennae of the trailing type. Thus, it will be seen that in order to eject the antenna 20 for use, the pilot has only to press the actuating member 17 of the valve 10 and the antenna will be instantaneously forced out of the tube 20 through the tail end of the fuselage of the aircraft by means of the piston 19 and when the pilot is through using the antenna all he has to do is to push the actuating member 18 of the valve 11 and the antenna 20 will be immediately retracted into the tube 5 by means of the suction acting on the piston 19 until the weight 21 strikes the end 7 of the tube, said weight 21 thus constituting a stop for the antenna.

It is desirable that the antenna wire 20 be automatically connected to a radio signalling unit shown generally at 22 when the antenna is ejected from the tube and to be automatically disconnected from the signalling unit immediately when the antenna is retracted into tube 5. For this purpose the antenna 20 is provided with a metallic contactor shown in the form of a brass knob 23 at the point where the antenna is connected to the piston, said knob 23 being adapted to engage a cooperating contact 24 at the outer end 7 of the tube 5. The contact 24 extends to the interior of the tube so that as the piston 19 flies outwardly, by means of pressure, toward the end 7, the contactor 23 immediately engages the contact 24, thereby providing a connection to the radio signalling unit by means of a conducting wire 25. Thus, it will be seen that the only time that the antenna 20 is connected to the radio signalling unit 22 is when the antenna wire is ejected from the aircraft for use and only when the piston 19 is at the outer end 7 of the tube 5.

Referring now to Figs. 2 and 3, there is shown a practical and preferred construction embodying the present invention, wherein the inner end of the tube 5 is secured to a support having a base 26 which is adapted to be fastened to the fuselage in any suitable manner as by means of screws (not shown) which are adapted to pass through a plurality of openings two of which are shown at 27 and 28. Carried by or formed integrally with the base 26 is a hollow cylindrical member 29 into which the end 8 of the tube 5 extends and is secured therein in any suitable manner to form an air-tight fit. Pivotally mounted on the cylinder member 29, as by means of screws 30 and 31 and bushings 32 and 33, and transversely thereof is a coupling element constituted by a bifurcated member 34 to provide ends 35 and 36 which engage the cylindrical member 29 on diametrically opposite sides thereof. For this purpose said cylindrical member is provided with two flattened portions on those sides, one of which is shown at 37 (Fig. 3).

The interior of the member 34 is provided with a chamber 38 which is adapted to communicate with the interior of the tube 5 by means of a channel or passage 39 and which merges with a threaded opening 40. A threaded nipple 41 is provided in the threaded opening 40 for connecting the conduit 12 to said member 34. Between the ends 35 and 36 of the member 34 and at the point where the body of said member engages the end of the cylindrical member 29, said member 34 is provided with a curved surface 42 (Fig. 3) which cooperates in sliding engagement with a corresponding curved surface on the engaging end of the cylindrical member 29 in order that the member 34 may be pivotally moved about the member 29 transversely thereof (in the direction of the arrow) to provide, in effect, a breech lock so that the connecting parts may be readily inspected without disconnecting the member 34 from the cylindrical member 29.

In order to permit pivotal movement of the member 34, the conduit 12 is preferably made of some suitable flexible material such as gum rubber hose. When the member 34 is in the position shown in Fig. 2, an air-tight connection is provided between the conduit 12 and the end 8 of the tube 5.

The piston 19, in the form shown in Fig. 2, is constituted by a pair of washers 43 and 44 of some suitable flexible material such as leather, for example, which form an air-tight fit within the tube 5. Each of the washers 43 and 44 is interposed between a pair of flanges 45, 46 and 47, 48, respectively. The flanges 46 and 47 are preferably secured to or formed integrally with a cylindrical hollow member 49 through which passes a short rod 50, while the flanges 45 and 48 are in the form of washers adapted to be placed on the rod 50 and held against the flexible washers 43 and 44 by means of nuts 51 and 52, respectively. The antenna wire 20 is connected to the piston 19 by means of contactor 23 which, as previously indicated, is preferably in the form of a brass spherical knob in order to provide a firm electrical connection with the contact 24 at the other end of the tube 5.

In the embodiment illustrated in Fig. 2, the contact 24 comprises an annular member, preferably of brass, having a flange or collar 53 and a hollow cylindrical portion 54 projecting from the plane of the flange, said cylindrical portion being provided with a tapered opening 55 at its outer end so as to form a seat for the cooperating contactor 23 when the latter bears thereagainst upon movement of the piston 19 to the outer end of the tube 5 when the antenna 20 is ejected from the tube.

The collar or flange 53 is secured to an insulating plate 56 in any suitable manner as, for example, by means of screws 57 and 58, said plate 56 being in turn secured to the tail end of the fuselage 6 in any suitable manner as, for example by means of screws 59 and 60. Adjacent the plate 56 is provided another insulating plate 61 and held thereagainst by the screws 59 and 60, said plate 61 having a central raised portion 62 concentrically arranged with an opening 63 provided in said plate and with an opening 64 provided in plate 56 through which the antenna cable 20 passes. The raised portion 62 of plate 61 acts as an abutment against which the weight 21 is adapted to strike when the antenna is retracted into the tube 5 and, as previously pointed out, the weight 21 serves as a stop.

Secured to the flange 53 by means of the screw 57 is a terminal lug 65 to which the lead-in wire 25 is adapted to be soldered for providing a permanent electrical connection between the contact 24 and said lead-in wire. Thus, it will be seen that when the antenna wire is ejected from the tube 5 by pressure acting on the piston 19, the contactor 23 is seated in the seat 55 of the cylindrical portion 54 of the contact 24 and thereby provides an automatic connection to the signalling unit 22 (Fig. 1) by means of the lead-in wire 25. On the other hand, when the antenna is retracted and drawn into the tube by suction acting on the piston 19, the connection is immediately and automatically broken.

Referring to Fig. 4 there is shown more or less schematically another embodiment of the invention wherein the tube 5 is coiled in a plurality of concentric convolutions instead of being in the form of a straight tube thereby permitting installation of the tube in a relatively small space when space is not available throughout the entire length of the fuselage, as shown, or from the tail thereof, if desired. Otherwise the structure of the entire mechanism is the same as that shown in Figs. 1, 2 and 3. If desired, however, the piston 19 may be made slightly arcuate to conform to the curvature of the convolutions of the tube in the event that the piston is found to be retarded when the antenna is being ejected from or retracted into the coiled tube.

There is thus provided a novel power retracting mechanism for radio antenna of the retractible type particularly adapted for use on aircraft whereby the antenna may be quickly and automatically ejected and retracted and whereby the antenna may be automatically connected to and disconnected from a radio signalling apparatus carried by the craft when the antenna is ejected and retracted, respectively.

Although only two embodiments of the invention have been illustrated and described, other changes and modifications in the form and relative arrangement of the parts, which will now appear to those skilled in the art, may be made without departing from the scope of the invention. Reference is, therefore, to be had to the appended claims for a definition of the limits of the invention.

What is claimed is:

1. In combination on an aircraft, a radio signalling apparatus, an antenna of the trailing type adapted to be connected to and disconnected from said signalling apparatus, a tube of substantially the same length as said antenna and forming a housing therefor, a source of fluid pressure connected to said tube, and means operated by said fluid pressure for ejecting said antenna from said retracting it into said tube.

2. In combination on an aircraft, a radio signalling apparatus, an antenna of the trailing type adapted to be connected to and disconnected from said signalling apparatus, a tube of substantially the same length as said antenna and forming a housing therefor, a source of fluid pressure connected to said tube, means operated by said fluid pressure for ejecting said antenna from and retracting it into said tube, and means for controlling the passage of said fluid pressure between said source and said tube.

3. In combination on an aircraft, a radio signalling apparatus, an antenna of the trailing type adapted to be connected to and disconnected from said signalling apparatus, a tube of substantially the same length as said antenna and forming a housing therefor, a source of fluid pressure connected to said tube, means operated by said fluid pressure for ejecting said antenna from and retracting it into said tube, and means effective upon ejection and retraction of said antenna from and into said tube for automatically connecting and disconnecting said antenna to and from said signalling apparatus.

4. In combination on an airplane, a tube extending substantially longitudinally of the fuselage of the airplane, a radio antenna of the trailing type within said tube and of substantially the same length as said tube, a source of fluid pressure connected to one end of said tube, the other end of said tube being open to the atmosphere, a piston in said tube and connected to one end of said antenna, and means for controlling the connection between said source and said tube to provide pressure or suction on said piston whereby the latter respectively ejects said antenna from or retracts it into said tube.

5. In combination on an airplane, a radio signalling apparatus, a tube extending substantially longitudinally of the fuselage of the airplane, a radio antenna of the trailing type within said tube and of substantially the same length as said tube, a source of fluid pressure connected to one end of said tube, the other end of said tube being open to the atmosphere, a piston in said tube and connected to one end of said antenna, means for controlling the connection between said source and said piston whereby the latter respectively ejects said antenna from or retracts it into said tube, and means including a contact carried by the tube at the outer end thereof and connected to the signalling apparatus, and a second contact carried by the antenna at its inner end for engaging said first contact to automatically connect said antenna to said signalling apparatus upon ejection of said antenna from said tube.

6. In combination on an airplane, a relatively long coiled tube, a radio antenna of the trailing type within said tube and of substantially the same length as said tube, a source of fluid pressure connected to one end of said tube, the other end of said tube being open to the atmosphere, a piston in said tube and connected to one end of said antenna, and means for controlling the connection between said source and said tube to provide pressure or suction on said piston whereby the latter respectively ejects or retracts said antenna from or into said tube.

7. In combination on an airplane, a radio signalling apparatus, a relatively long coiled tube, a radio antenna of the trailing type within said tube and of substantially the same length as said tube, a source of fluid pressure connected to one end of said tube, the other end of said tube being open to the atmosphere, a piston in said tube and connected to one end of said antenna, means for controlling the connection between said source and said tube to provide pressure or suction on said piston whereby the latter respectively ejects or retracts said antenna from or into said tube, and means including a contact carried by the tube at the outer end thereof and connected to the signalling apparatus, and a second contact carried by the antenna at its inner end for engaging said first contact to automatically connect said antenna to said signalling apparatus upon ejection of said antenna from said tube.

8. In combination, a radio antenna of the trailing type for aircraft, a tube forming a housing for said antenna, a source of fluid pressure connected to said tube, and means operated by said fluid pressure for ejecting said antenna from and retracting it into said tube.

9. In combination, a radio antenna of the trailing type for aircraft, a coiled tube forming a housing for said antenna, a source of fluid pressure connected to said tube, and means operated by said fluid pressure for ejecting said antenna from and retracting it into said tube.

10. In combination, a radio antenna of the trailing type for aircraft, a concentrically coiled tube forming a housing for said antenna, a source of fluid pressure connected to said tube, and means operated by said fluid pressure for ejecting said antenna from and retracting it into said tube.

11. In combination, a radio antenna, a tube forming a housing for said antenna, a source of fluid pressure connected to said tube, and means operated by said fluid pressure for ejecting said antenna from and retracting it into said tube.

12. In combination, a radio antenna, a tube forming a housing for said antenna, a source of fluid pressure connected to said tube, and means operated by said fluid pressure for ejecting said antenna from said tube.

13. In combination, a radio antenna, a tube forming a housing for said antenna, a source of fluid pressure connected to said tube, means operated by said fluid pressure for ejecting said antenna from said tube, and manually actuated means for controlling said fluid pressure.

14. In combination, a radio antenna, a tube forming a housing for said antenna, a source of fluid pressure connected to sad tube, and means operated by said fluid pressure for retracting said antenna into said tube.

15. In combination with an aircraft having a body provided with an opening, an antenna housing rigidly secured within said body and adjacent said opening, a coiled antenna cable in said housing, and manually controlled mechanism for forcibly ejecting said antenna cable out of said housing through said opening.

16. In combination, a retractable radio antenna, a coiled tube forming a housing for said antenna, a source of fluid pressure connected to said tube, and means operated by said fluid pressure for ejecting said antenna from said tube.

17. In combination, a reciprocable radio antenna comprising a conductive member, means for electrically insulating said member, a tube surrounding said antenna and forming a housing therefor, means supplying fluid pressure to said tube, and means operated by said fluid pressure and cooperating with said tube for producing movement of said antenna in a desired direction.

18. In combination, a retractable antenna comprising a conductive member, a tube surrounding said member and forming a protective housing therefor, means for electrically insulating said member, means supplying a fluid pressure of a desired value to said tube, and means operated by the difference between said fluid pressure and atmospheric pressure and cooperating with said tube for producing movement of said antenna in a desired direction.

19. In combination, a tubular casing constituting a fluid pressure cylinder, a piston reciprocable in said cylinder, a radio antenna connected at one end thereof to said piston and adapted to be ejected from and drawn into said cylinder which also forms a housing for said antenna, means for insulating said antenna, a source of fluid pressure connected to said cylinder, and manually operable means for controlling the admission of fluid pressure from said source to said cylinder and for ejecting said antenna therefrom by said piston.

20. In combination with a vehicle, a retractable radio antenna, a tubular casing constituting a housing for said antenna and forming a fluid pressure cylinder, a piston reciprocable in said cylinder and connected to one end of said antenna, means insulating said antenna from said vehicle when said antenna is in operative position and extending out of said cylinder, a source of fluid pressure connected to said cylinder for operating said piston, and manually operable means for controlling the fluid pressure from said source to said cylinder to actuate said piston, whereby said antenna is ejected from and retracted into said cylinder.

GEORGE ELLIS IRVIN.